United States Patent [19]

Sato et al.

[11] 4,011,841
[45] Mar. 15, 1977

[54] GASOLINE ENGINE OF FOUR-CYCLE IGNITION TYPE

[75] Inventors: Tadanori Sato, Hachioji; Toshiaki Matsushita, Hino; Isao Matsuno, Tachikawa, all of Japan

[73] Assignee: Fuji Jukogyo Kabushiki Kaisha, Tokyo, Japan

[22] Filed: Mar. 3, 1975

[21] Appl. No.: 555,060

[30] Foreign Application Priority Data

Mar. 5, 1974  Japan .................................. 49-25451

[52] U.S. Cl. ........................ 123/32 B; 123/32 MS
[51] Int. Cl.² ................................................ F02B 3/00
[58] Field of Search ............. 123/32 B, 32 C, 32 D, 123/32 K, 32 ST, 32 SP, 33 D, 191 S, 191 ST, 148 DS, 32 MS

[56] References Cited
UNITED STATES PATENTS

| | | | |
|---|---|---|---|
| 1,722,145 | 7/1929 | Hermann | 123/32 MS |
| 3,809,042 | 5/1974 | Hosho et al. | 123/148 DS |

FOREIGN PATENTS OR APPLICATIONS

| | | | |
|---|---|---|---|
| 464,601 | 8/1930 | Germany | 123/32 B |
| 114,338 | 10/1900 | Germany | 123/32 B |
| 449,953 | 7/1936 | United Kingdom | 123/32 B |
| 299,807 | 9/1929 | United Kingdom | 123/32 B |
| 1,242,594 | 8/1971 | United Kingdom | 123/32 MS |

*Primary Examiner*—Charles J. Myhre
*Assistant Examiner*—Paul Devinsky
*Attorney, Agent, or Firm*—Martin A. Farber

[57] ABSTRACT

An internal combustion engine in which a cylinder head is formed with a pocket and a main piston is formed with an auxiliary piston slidable in the pocket. A combustion chamber is defined between the cylinder head and the main piston. The combustion chamber includes first and second combustion spaces defined between the pocket and the auxiliary piston and between the cylinder head and the main piston when the piston is substantially at a position near a top dead center of a piston stroke. Homogeneous air-fuel mixtures are compressed in the first and second combustion spaces and are ignited by first and second spark plugs disposed in the first and second combustion spaces, respectively, at different times, such that the combustions will be effected at different flame propagation speeds.

10 Claims, 7 Drawing Figures

GASOLINE ENGINE OF FOUR-CYCLE IGNITION TYPE

This invention relates to gasoline powered internal combustion engines and, more particularly, to an improvement over such engines and, more particularly, to an improvement over such engines.

In order to reduce the nitric-oxide in exhaust gases, a gasoline-powered internal combustion engine is generally operated in such a manner that the ignition timing is delayed, so as to lower the peak of pressure and temperature in the combustion stroke.

Nevertheless, such engine drive does not avoid the low power and high expenditure.

It is an object of the present invention to provide a method of operating a gasoline-powered internal combustion engine which reduces the nitric oxide content in the exhaust gases.

It is another object of the present invention to provide an improved gasoline-powered internal combustion engine by which the nitric oxide content in the exhaust gases is significantly reduced.

It is another object of the present invention to provide an improved gasoline powered internal combustion engine which is simple in construction and low in manufacturing costs.

It is still another object of the present invention to provide an improved gasoline-powered internal combustion engine having an auxiliary combustion chamber and a main combustion chamber, wherein homogeneous air-fuel mixtures are separately ignited at different ignition spark timings.

It is a further object of the present invention to provide an improved gasoline-powered internal combustion engine which has improved operating characteristics which result in a reduction of the nitric oxides in the exhaust gases.

It is a further object of the present invention to provide an improved gasoline-powered internal combustion engine wherein the pressure rise of the ignited air-fuel mixture occurs stepwise, thereby effecting the combustion at low maximum temperatures, whereby the nitric oxides in the exhaust gases are significantly reduced.

Other objects, features and advantages of this invention will be understood from the following description with reference to the accompanying drawings as follows.

Figure 1:
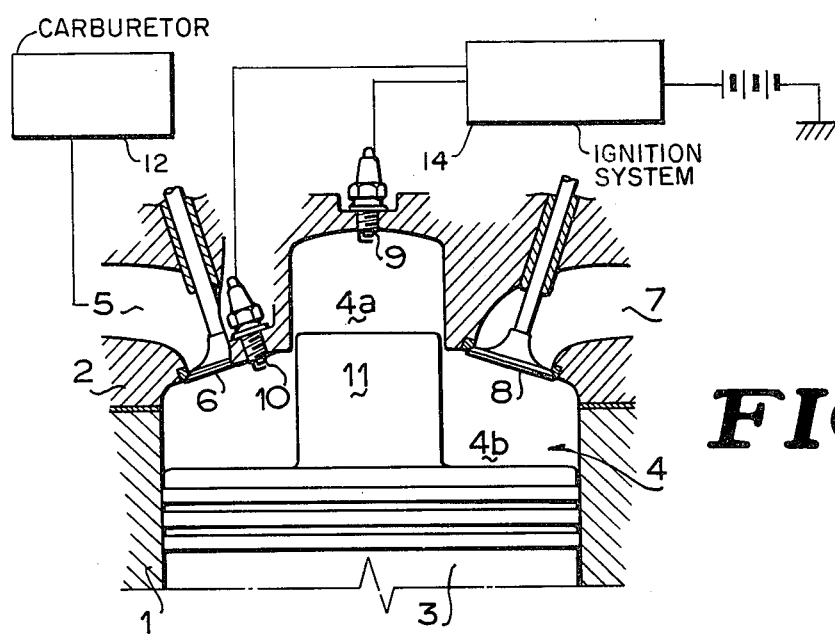
FIG. 1 is a vertical cross-section of a preferred embodiment of a gasoline-powered internal combustion engine according to the present invention by which a method of the present invention can be carried out.

Referring to FIG. 1, there is provided an engine, embodying the present invention, which includes a hollow cylinder 1, a cylinder head 2, a main piston 3 slidably reciprocating in the cylinder 1 and a combustion chamber 4 formed in the cylinder head 2; an intake port 5 with an intake valve 6 and an exhaust port 7 with an exhaust valve 8 both opened at the ceiling portion of the chamber 4; and two ignition spark plugs 9 and 10.

The piston 3 includes a partition 11 or an auxiliary piston integrally formed on top of the piston 3, and the combustion chamber 4 is separated into two compartments or combustion spaces 4a and 4b when the partition 11 slidably enters the compartment 4a in the forward portion of the piston reciprocation. The compartment 4a is defined by a pocket formed in the cylinder head 2. The ignition plugs 9 and 10 are disposed in the compartments 4a and 4b respectively.

The intake port 5 is connected to a carburetor 12 and supplied with a homogeneous air-fuel mixture therefrom. The carburetor 12 may be of any known construction and, therefore, a detailed description of the same is herein omitted for the sake of simplicity of description. The spark plugs 9 and 10 are electrically connected to an ignition system 14 which is arranged to energize the first and second spark plugs 9 and 10 at first and second predetermined ignition spark timings respectively, so that the homogeneous air-fuel mixture in the first combustion space 4a is initially ignited and the homogeneous air-fuel mixture in the second combustion space 4b is subsequently ignited. The ignition system 14 is well known in the art and, therefore, a detailed description of the same is omitted.

Preferably, the compartments are formed in the cylinder head 2 to form stepped bores, which are arranged coaxially to the cylinder bore so that the combustion forces the piston 3 along or near its center line.

The other parts of the engine are removed from the drawing to avoid complicated illustration.

In operation, the valve 6 opens the intake port 5 to communicate it with the combustion chamber 4, and then the homogeneous air-fuel mixture is supplied into the combustion chamber 4 from the carburetor 12. Near the bottom dead point of the piston stroke, the valve 6 closes the port 5 to intercept the communication with the chamber 4, and the piston 3 is upwardly moved for the compression stroke. When the main piston is substantially at a position near a top dead center during the compression stroke the auxiliary piston 11 is slidably inserted into the pocket 4a and separates the combustion chamber 4 into two isolated first and second combustion spaces 4a and 4b for a predetermined time interval.

Near the top dead point of the piston stroke, the ignition plug 9 is initially energized to ignite the homogeneous air-fuel mixture in the first combustion space 4a. In this instance, the flame in the first combustion space will propagate at a first speed thereby causing a portion of unburned air-fuel mixture to pass into the second combustion space 4b through a gap between the outer periphery of the auxiliary piston 11 and the inner wall of the pocket 4a to form a vortex in the second combustion space 4b. After the air-fuel mixture has been ignited in the first combustion space 4a energized to ignite the air-fuel mixture in the second combustion space 4b during the expansion stroke.

Figure 6:
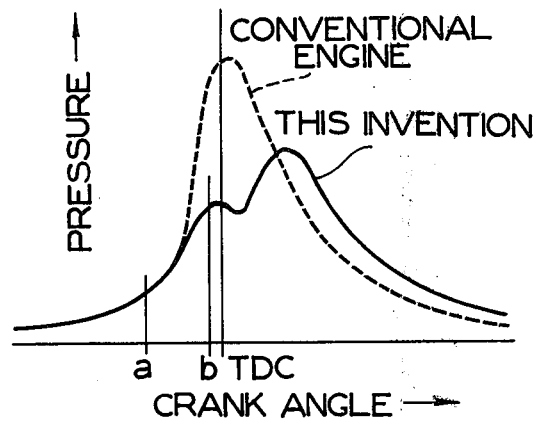
FIG. 6 is a diagram wherein an experimental curve according to this invention is shown compared to that of the prior engine of standard type.

When the homogeneous air-fuel mixture in the first and second combustion spaces 4a and 4b are consecutively ignited at different ignition spark times or timings, the pressures in the first and second combustion spaces 4a and 4b will vary stepwise in a manner as shown by the solid curve in FIG. 6. In this instance, the maximum temperature in the combustion chamber 4 is maintained at a level lower than in the conventional internal combustion engine. Since, further, both of the combustions of the homogeneous air-fuel mixtures in the first and second combustion spaces 4a and 4b, respectively, are satisfactorily effected, the concentration of nitric oxides in the engine exhaust gases is significantly reduced. In this case, the maximum pressure in the combustion chamber 4 is lower than that in the conventional internal combustion engine, of which the pressure rise is shown by the dashed line in FIG. 6.

Near the bottom dead point of the piston stroke, the exhaust valve 8 opens the port 7 to communicate it with the chamber 4 and then the forward portion of the piston reciprocation for the exhaust stroke is started.

In this embodiment, a part of the exhaust gases remains in the compartment 4a due to the insertion of the sub-piston 11 into the compartment 4a. The remaining exhaust gases dilute the mixture newly supplied to the chamber 4 during the intake stroke of the piston.

This engine allows the use of a lean-set mixture so that the exhaust gases contain a very slight amount of hydrocarbons and carbon oxide as well as the slight amount of nitric-oxide.

Figure 7:
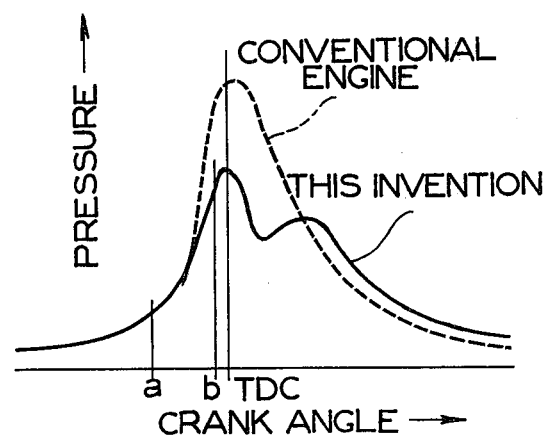
FIG. 7 is a diagram wherein another experimental curve according to this invention shown compared to that of the prior engine.

If the compartment to be first ignited has a larger mixture volume than that of the other compartment, the curve of pressure is as shown in FIG. 7 wherein the first peak of the curve is higher than the second one, so that the engine power is slightly reduced as compared with that of FIG. 1. Therefore, the ignition plug 10 in the first-mentioned embodiment may be used as a first ignition plug which is located in the compartment 4b. The ignition plug 9 is used as a second ignition plug located in the compartment 4a in that case mentioned above. The second plug 9 is energized at a delayed timing.

Figure 2:
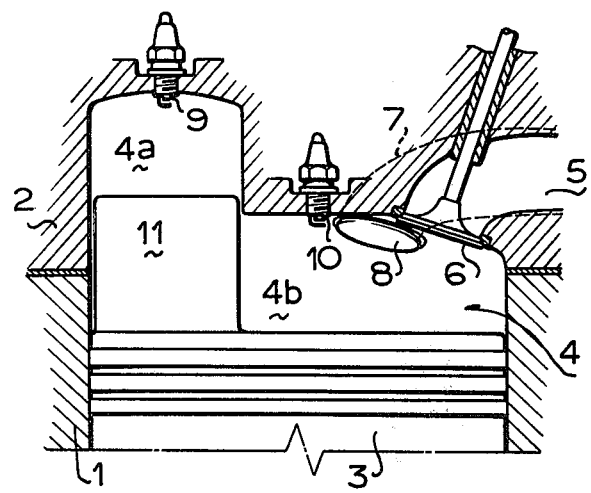
FIG. 2 is a vertical cross-section of a modified form of the internal combustion engine shown in FIG. 1.

FIG. 2 indicates a gasoline engine modified from the first embodiment, in which the auxiliary piston 11 is formed on top of the main piston 3 at a position displaced from the center line of the piston or cylinder bore and a pocket 4a is formed in the cylinder head 2 at a position aligned with the auxiliary piston 11, so that the compartment 4b has a ceiling area so enlarged as to arrange the intake and exhaust ports thereon.

Figure 3:
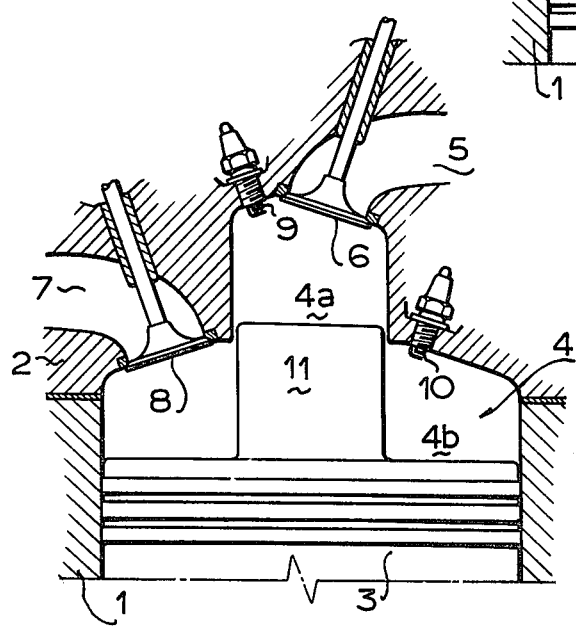
FIG. 3 is a vertical cross-section of a further modified form of the internal combustion engine shown in FIG. 1.

FIG. 3 indicates a gasoline engine wherein an intake port 5 having an intake valve 6 communicates with the first compartment 4a and an exhaust port 7 having an exhaust valve 8 communicates with the second compartment 4b.

Accordingly, the compartment 4a is kept with a mixture which is not diluted by the remaining exhaust gases existing in the chamber 4, because the mixture is supplied to the compartment at a final stage of the back portion of the piston reciprocation, though the mixture supplied in the compartment 4b is diluted by the remaining exhaust gases, so that the combustibility in the compartment 4a, even though the mixture is lean-set, is adequately maintained.

This type engine further has an advantage in that the intake valve 6 is capable of opening the intake port 5 before the auxiliary piston 11 is inserted into the compartment 4a so that due to the inertia of exhaustion, the remaining exhaust gases in the compartment 4a flows into the compartment 4b and then to the exhaust port 7, and the compartment 4a is scavenged with the mixture progressively supplied before the separation of the chamber 4.

In this case, the plug to be the first ignited may be either one of the plugs 9 and 10.

Figure 4:
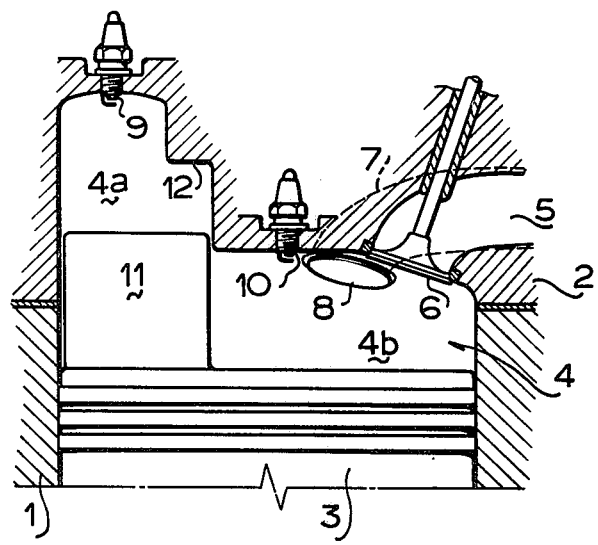
FIG. 4 is a vertical cross-section of a further modified form of the internal combustion engine shown in FIG. 1.

FIG. 4 indicates a modification from that of FIG. 2. An engine illustrated in FIG. 4 is distinguished from the other embodiment by having a shoulder 12 located in the compartment 4a. The shoulder 12 is specially formed into a stepshape having a flat surface facing the top of the partition or auxilliary piston 11. In the compartment 4a, when the top of the partition 11 is carried toward the flat surface in the final stage of the forward portion of the piston reciprocation for compression stroke, the mixture is caused to impinge upon the shoulder 12, so that the air-fuel mixture in the first combustion space 4a is stirred. Such stirring is available to improve the combustibility of the lean-set mixture.

Figure 5:
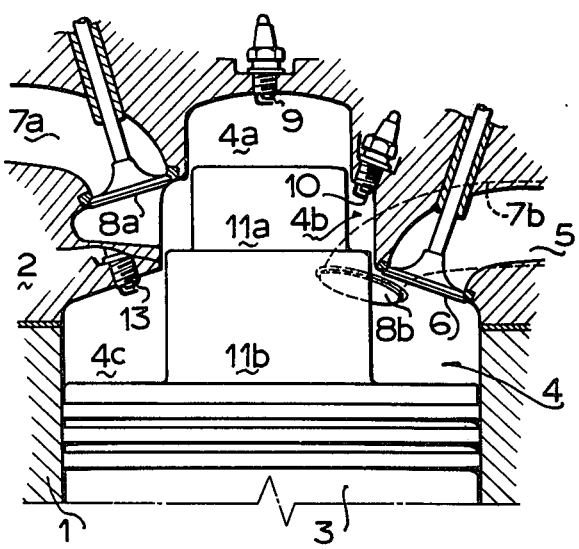
FIG. 5 is a vertical cross-section of another embodiment of this invention.

Another embodiment of this invention is illustrated in FIG. 5 wherein there are provided a piston 3 including two partitions or auxilliary pistons 11a and 11b having different diameters and arranged in tandem on the axial line of the piston or cylinder bore, a combustion chamber 4 separated into three compartments 4a, 4b and 4c by the partitions 11a and 11b, and three spark plugs 9, 10 and 13 disposed in the compartments, respectively.

An intake port 5 with an intake valve 6 communicates with the compartment 4c, and two exhaust ports 7a and 7b with two exhaust valves 8a and 8b communicate with the compartments 4b and 4c.

In this case, the compartment 4a is isolated from both the exhaust ports after the combustion chamber is separated into the compartments in the forward portion of the piston reciprocation of the exhaust stroke, so that the exhaust gases shut in the compartment 4a spread into the chamber 4 while the back portion of the piston reciprocation is performed for the admission stroke so as to dilute the mixture.

The spark plugs 9 and 10 have different delay timings for energization, respectively, so as to be energized after the preceding plug is energized and before the adjacent compartments communicate with each other in the back portion of the piston reciprocation for the combustion stroke.

The operation of such an embodiment is approximately the same as or identical with that of the other embodiments mentioned above, except for the step numbers of the respective combustions according to the compartments 4a and 4c.

What is claimed is:

1. A method of operating a gasoline-powered internal combustion engine having a combustion chamber, comprising the steps of
    supplying a homogeneous air-fuel mixture into the combustion chamber,
    dividing the combustion chamber into temporarily non-communicating first and second combustion spaces starting before reaching top dead center for a predetermined time interval by having a piston assume a position near top dead center, during a compression stroke, with a cylinder head, said piston and said cylinder head being cooperatively stepped, with said first combustion space having a volume smaller than that of said second combustion space; and igniting by means of a spark plug means located in the first and second combustion spaces the air-fuel mixtures in the first and second combustion spaces, respectively, at different timings during the predetermined time interval when said first and second combustion spaces are non-communicating, thereby effecting combustions of the air-fuel mixtures in the first and second combustion spaces at first and second flame propagation speeds, respectively.

2. A method of operating a gasoline-powered internal combustion engine having a cylinder, intake and exhaust ports for said cylinder, a cylinder head formed with a pocket, a main piston reciprocally operable in said cylinder and including an auxiliary piston integral with said main piston, said auxiliary piston being slidable in said pocket, a combustion chamber defined between said cylinder head and said main piston, and first and second spark plugs for said combustion chamber, the method comprising the steps of:

supplying homogeneous air-fuel mixture into the combustion chamber;

compressing the homogeneous air-fuel mixture in the combustion chamber;

dividing the combustion chamber into temporarily non-communicating first and second combustion spaces starting before reaching top dead center for a predetermined time interval by moving the auxiliary piston into the pocket with the main piston assuming a position near a top dead center during a compression stroke thereof, in which the first combustion space is smaller in volume that the second combustion space;

energizing the first spark plug igniting the air-fuel mixture in the first combustion space during said predetermined time interval when said first and second combustion spaces are non-communicating; and energizing the second spark plug igniting the air-fuel mixture in the second combustion space after the air-fuel mixture in the first combustion space has been ignited yet also during said predetermined time interval when said first and second combustion spaces are non-communicating.

3. The method according to claim 2, wherein combustions of the air-fuel mixtures in the first and second combustion spaces, respectively, are effected at first and second flame propagation speeds, respectively.

4. The method according to claim 2, wherein an intake of the air-fuel mixture and an exhausting of combustion gases are initiated into and from the second combustion space via the intake and exhaust ports, respectively, communicating directly with the second combustion space.

5. The method according to claim 2, wherein an intake of the air-fuel mixture and an exhausting of combustion gases are initiated into and from the first and second combustion spaces, respectively, via the intake port and the exhaust port communicating directly with the first and second combustion spaces, respectively.

6. In a gasoline-powered internal combustion engine, the improvement comprising:

a cylinder;

an intake port means and an exhaust port means communicating with said cylinder;

a cylinder head adjacent said cylinder, said cylinder head having a pocket formed therein;

a main piston reciprocally operatively disposed in said cylinder, said main piston having a top;

an auxilliary piston means integrally formed on the top of said main piston and disposed movably into said pocket for non-communicatingly separating the latter and movably out of said pocket;

a combustion chamber defined between the top of said main piston and said cylinder head, said combustion chamber being divided into non-communicatingly separated first and second combustion spaces, respectively, defined between said pocket and said auxiliary piston means, and defined between said main piston and said cylinder head, respectively, when said auxiliary piston means is in said pocket, said first and second combustion spaces thereby being non-communicatingly separated from each other for a predetermined time interval when said main piston is at a position near a top dead center during a compression stroke when said auxiliary piston means is in said pocket, said first combustion space having a volume smaller than said second combustion space;

said intake port means for supplying homogeneous air-fuel mixture into said combustion chamber;

first and second spark plugs disposed in said first and second combustion spaces, respectively; and ignition control means for energizing said first and second spark plugs, respectively, at different times for effecting combustions of the homogeneous air-fuel mixtures in said non-communicating separated first and second combustion spaces at different flame propagation speeds, respectively, when said first and second combustion spaces are non-communicatingly separated when said auxiliary piston means is in said pocket.

7. The improvement according to claim 6, in which said intake port means and said exhaust port means are operatively disposed in said second combustion space.

8. The improvement according to claim 6, in which said intake port means and said exhaust port means are operatively disposed in said first and second combustion spaces, respectively.

9. The improvement according to claim 6, in which said pocket forms stepped bores and said auxiliary piston means comprises stepped portions which are slidable in said stepped bores.

10. The method as according to claim 1, wherein the step of igniting the air-fuel mixture in the second combustion space is initiated subsequent to and independent of the ignition and combustion of the air-fuel mixture in the first combustion space.

* * * * *

UNITED STATES PATENT AND TRADEMARK OFFICE
CERTIFICATE OF CORRECTION

PATENT NO. : 4 011 841
DATED : March 15, 1977
INVENTOR(S) : Tadanori Sato et al

It is certified that error appears in the above-identified patent and that said Letters Patent are hereby corrected as shown below:

COLUMN 2 LINE 66 after "4a" insert:

-- , the ignition plug 10 is secondly --;

CLAIM 1:
COLUMN 4 LINE 63 after "center" delete the comma ",";

LINE 64 after "stroke" delete the comma ",";

CLAIM 2:
COLUMN 5 Line 33 change "that" to -- than --.

Signed and Sealed this

Seventh Day of June 1977

[SEAL]

Attest:

RUTH C. MASON
Attesting Officer

C. MARSHALL DANN
Commissioner of Patents and Trademarks